(12) United States Patent
Skavicus

(10) Patent No.: US 10,160,149 B2
(45) Date of Patent: Dec. 25, 2018

(54) ACCESS TO COOLING MANIFOLD VALVE CONTROLS IN INJECTION MOLDING OPERATIONS

(71) Applicant: Plastixs, LLC, Shrewsbury, MA (US)

(72) Inventor: Paul J. Skavicus, Maynard, MA (US)

(73) Assignee: Plastixs, LLC, Shrewsbury, MA (US)

( * ) Notice: Subject to any disclaimer, the term of this patent is extended or adjusted under 35 U.S.C. 154(b) by 0 days.

(21) Appl. No.: 15/480,080

(22) Filed: Apr. 5, 2017

(65) Prior Publication Data
US 2018/0290362 A1    Oct. 11, 2018

(51) Int. Cl.
| F16L 41/02 | (2006.01) |
| F16K 27/00 | (2006.01) |
| F16K 31/60 | (2006.01) |
| B29C 45/73 | (2006.01) |
| F16L 41/03 | (2006.01) |
| B29C 45/76 | (2006.01) |

(52) U.S. Cl.
CPC .......... *B29C 45/7306* (2013.01); *B29C 45/76* (2013.01); *F16K 27/003* (2013.01); *F16K 31/602* (2013.01); *F16L 41/03* (2013.01); *B29C 2945/76545* (2013.01); *B29C 2945/76782* (2013.01); *B29C 2945/76892* (2013.01)

(58) Field of Classification Search
CPC ....... F16L 41/025; F16L 41/03; F16K 27/003; F16K 31/60; F16K 31/602; F16K 31/604; F16K 31/605; F16K 31/607; F15B 13/0814; F15B 13/0816; B29C 45/7306; B29C 2945/76304; B29C 2945/76782

USPC .......................................... 137/637, 862, 863
See application file for complete search history.

(56) References Cited

U.S. PATENT DOCUMENTS

| 456,256 | A | * | 7/1891 | Fletcher | F02D 9/02 |
| | | | | | 123/403 |
| 594,637 | A | * | 11/1897 | Manning | B01D 35/153 |
| | | | | | 137/637 |
| 781,897 | A | * | 2/1905 | McGillivray | F15B 13/0417 |
| | | | | | 137/596 |
| 1,157,235 | A | * | 10/1915 | McElroy | F16K 11/20 |
| | | | | | 137/625.43 |
| 1,194,676 | A | * | 8/1916 | Slaw | B60G 17/0525 |
| | | | | | 137/627.5 |

(Continued)

OTHER PUBLICATIONS

Manifolds Single Point Setting, 8 Pairs of Circuits; Plastic Process Equipment, Inc., www.ppe.com, downloaded Mar. 24, 2017.

*Primary Examiner* — Seth W Mackay-Smith
(74) *Attorney, Agent, or Firm* — Fox Rothschild LLP; Robert J. Sacco; Carol E. Thorstad-Forsyth

(57) ABSTRACT

In an injection molding system a cooling manifold system includes a first manifold disposed adjacent to a second manifold. Supply valves are arranged to selectively pass a coolant from the first manifold respectively to each of a plurality of mold cooling circuits and a plurality of return valves are arranged to selectively pass the coolant from the plurality of mold cooling circuits to the second manifold when one or more of a plurality of return valves is in an open position. Valve pairs associated with a common mold cooling circuit are mechanically linked so that operation of a supply valve and return valve can be concurrently performed from one side of the manifold system without interference from a plurality of hoses attached to the supply and return valves.

13 Claims, 4 Drawing Sheets

(56) References Cited

U.S. PATENT DOCUMENTS

| | | | | |
|---|---|---|---|---|
| 2,219,118 | A | * 10/1940 | Schumann | F23D 11/12 |
| | | | | 137/637 |
| 3,943,791 | A | 3/1976 | Casey | |
| 4,474,357 | A | 10/1984 | Noffke | |
| 4,617,969 | A | 10/1986 | Weiger et al. | |
| 5,138,756 | A | * 8/1992 | Johnson | E02F 9/2004 |
| | | | | 137/289 |
| 5,704,398 | A | * 1/1998 | Baker | F16K 11/161 |
| | | | | 137/637 |
| 5,727,772 | A | 3/1998 | Rothammer | |
| 6,216,737 | B1 | * 4/2001 | Taylor | F16K 11/22 |
| | | | | 137/271 |
| 8,789,560 | B2 | * 7/2014 | Holley | F16K 11/165 |
| | | | | 137/597 |
| 9,004,106 | B2 | * 4/2015 | Schlichter | B01D 35/12 |
| | | | | 137/637 |
| 9,915,376 | B2 | * 3/2018 | Hutton | F16K 43/00 |
| 2010/0181509 | A1 | * 7/2010 | Held | E03C 1/041 |
| | | | | 251/90 |
| 2016/0238157 | A1 | * 8/2016 | Hutton | F16K 5/0642 |

* cited by examiner

ACCESS TO COOLING MANIFOLD VALVE CONTROLS IN INJECTION MOLDING OPERATIONS

BACKGROUND

Statement of the Technical Field

The technical field of this disclosure comprises injection molding systems, and more particularly concerns cooling circuits which are used for injection molding systems.

Description of the Related Art

Injection molding of plastic involves forcing liquefied plastic under pressure (injecting it) into a mold. The mold is then cooled to solidify the plastic. Cooling is accomplished by circulating water around the part, then through channels that are in the mold. Water continually enters and exits these channels from ports on the outside surface of the mold. The water input, mold channel and water exit will be referred to as a cooling circuit. Water from a heat exchanger is supplied to the input of each circuit through a hose where it travels the channel and cools the part. The water becomes heated and exits the circuit into a hose where it returns to a heat exchanger before repeating the cycle.

Molds can have multiple cooling circuits. Accordingly, water manifolds are used to provide a common point where the supply hoses can originate from. The return water hose are then connected to its own manifold prior to entering the heat exchanger. Since different molds can have a varying number of water circuit's valves are used on the supply and return manifolds to allow any unused water circuits to be shut off.

SUMMARY

Embodiments disclosed herein concern methods and systems for improving access to a plurality of coolant valves in an injection molding system. In an injection molding system a first manifold is disposed adjacent to a second manifold. The manifolds are arranged so that a plurality of ports disposed along a length of the first manifold, and a plurality of ports disposed along a length of the second manifold are each aligned along a direction which is parallel to a central axis. The method involves connecting external to the first manifold at least one plurality of supply valves. The supply valves are arranged to selectively pass a coolant from the first manifold respectively to each of a plurality of mold cooling circuits in an injection molding system when one or more of the plurality of supply valves are in an open position. The method further involves connecting external to the second manifold a plurality of return valves. The plurality of return valves are arranged to selectively pass the coolant from the plurality of mold cooling circuits to the second manifold when one or more of a plurality of return valves is in an open position.

For each adjacent valve pair comprising a supply valve and a return valve associated with a common mold cooling circuit, a mechanical linkage is used external of the first and second manifold to mechanically couple a supply valve control stem of the supply valve, to a return valve control stem of the return valve. Thereafter, the supply valve and return valve of at least one of the adjacent valve pairs is concurrently transitioned between the open position and a closed position, in which coolant cannot pass to the plurality of cooling circuits. This process involves using a handle grip portion of the mechanical linkage which extends away from the first and second manifolds in a direction transverse to the central axis.

The method can further involve arranging the mechanical linkage provided for each of the adjacent valve pairs so that the handle grip associated with each the mechanical linkage is on the same side of the central axis. A plurality of supply hoses and return hoses are respectively connected to the plurality of supply valves and return valves. These hoses are then extended away from the manifold system on a side of the manifold system opposed from the handle grip portion of the mechanical linkage. Thereafter, the mechanical linkage can be operated to concurrently adjust the supply valve and return valve of an adjacent valve pair exclusively from a single location disposed on one side of the central axis without concern for interference with the hoses.

Embodiments also concern a manifold system for an injection molding apparatus having improved access to a plurality of coolant valves. The system includes a first manifold disposed adjacent to a second manifold. Each manifold has a plurality of ports respectively aligned along a length direction which is parallel to a central axis. A plurality of supply valves are disposed externally of the first manifold and respectively connected to the plurality of ports. The plurality of supply valves are each configured to selectively pass a coolant from the first manifold. A plurality of return valves are disposed externally of the second manifold. The return valves are respectively connected to the plurality of ports. The return valves are each configured to selectively pass the coolant to the second manifold after the coolant has respectively traversed one of a plurality of mold cooling circuits.

Each of a plurality of adjacent valve pairs comprising a supply valve and a return valve associated with a common mold cooling circuit includes a mechanical linkage. This linkage is provided external of the first and second manifold. The mechanical linkage is operatively connected to a supply valve control stem of the supply valve and to a return valve control stem of the return valve. The mechanical linkage includes a handle grip portion which extends away from the first and second manifolds in a direction transverse to the central axis to facilitate concurrent rotation of the supply valve control stem and the return valve control stem. Consequently, movement of the handle grip by an operator can concurrently transition both the supply valve and the return valve from an open state to a closed state.

The mechanical linkage provided for each of the adjacent valve pairs are oriented so that the handle grip associated with each the mechanical linkage is on a common side of the central axis. Moreover, a plurality of supply hoses and return hoses which are respectively connected to the plurality of supply valves and return valves will advantageously extend away from the manifold system on a common side of the manifold system opposed from the handle grip portion of the mechanical linkage.

In an embodiment, the mechanical linkage described herein is comprised of a first crank-arm fixed to the supply valve control stem for rotation therewith, a second crank-arm fixed to the return valve control stem for rotation therewith, and a link member which extends from the first crank-arm to the second crank-arm. The first crank-arm extends transverse to a first stem axis aligned with the supply valve control stem, and the second crank-arm extends transverse to a second stem axis aligned with the return valve control stem. According to one aspect, the first crank arm extends in a first radial direction away from the first stem axis along at least a first portion proximal to the supply valve control stem, and deviates from the first radial direction along a second portion distal from the supply valve control stem. The second crank arm similarly extends in a second radial direction away from the second stem axis along a first portion proximal to the return valve control stem, and deviates from the first radial direction along a second portion distal from the return valve control stem. The link member is pivotally connected to a first end portion of the first crank-arm distal from the supply valve control stem, and pivotally connected to a second end portion of the second crank arm distal from the return valve control stem. The link member extends in a direction which is transverse to both of the first stem axis and the second stem axis.

BRIEF DESCRIPTION OF THE DRAWINGS

Embodiments will be described with reference to the following drawing figures, in which like numerals represent like items throughout the figures, and in which.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

Figure 1:
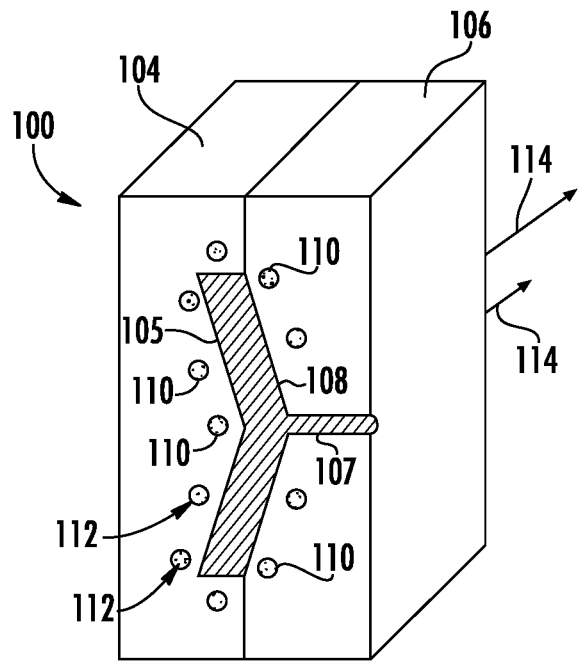
FIG. 1 is a drawing which is useful for understanding a mold used in an injection molding process.
Figure 2:
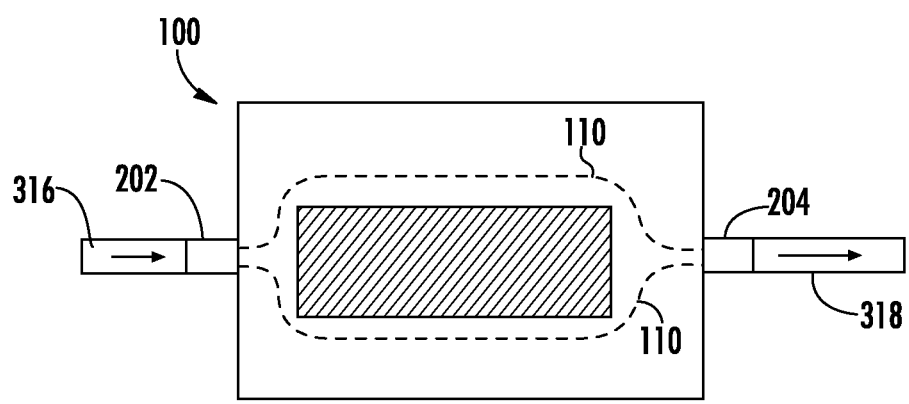
FIG. 2 is a drawing which is useful for understanding a cooling circuit which is used to cool a mold in an injection molding process.
Figure 3:
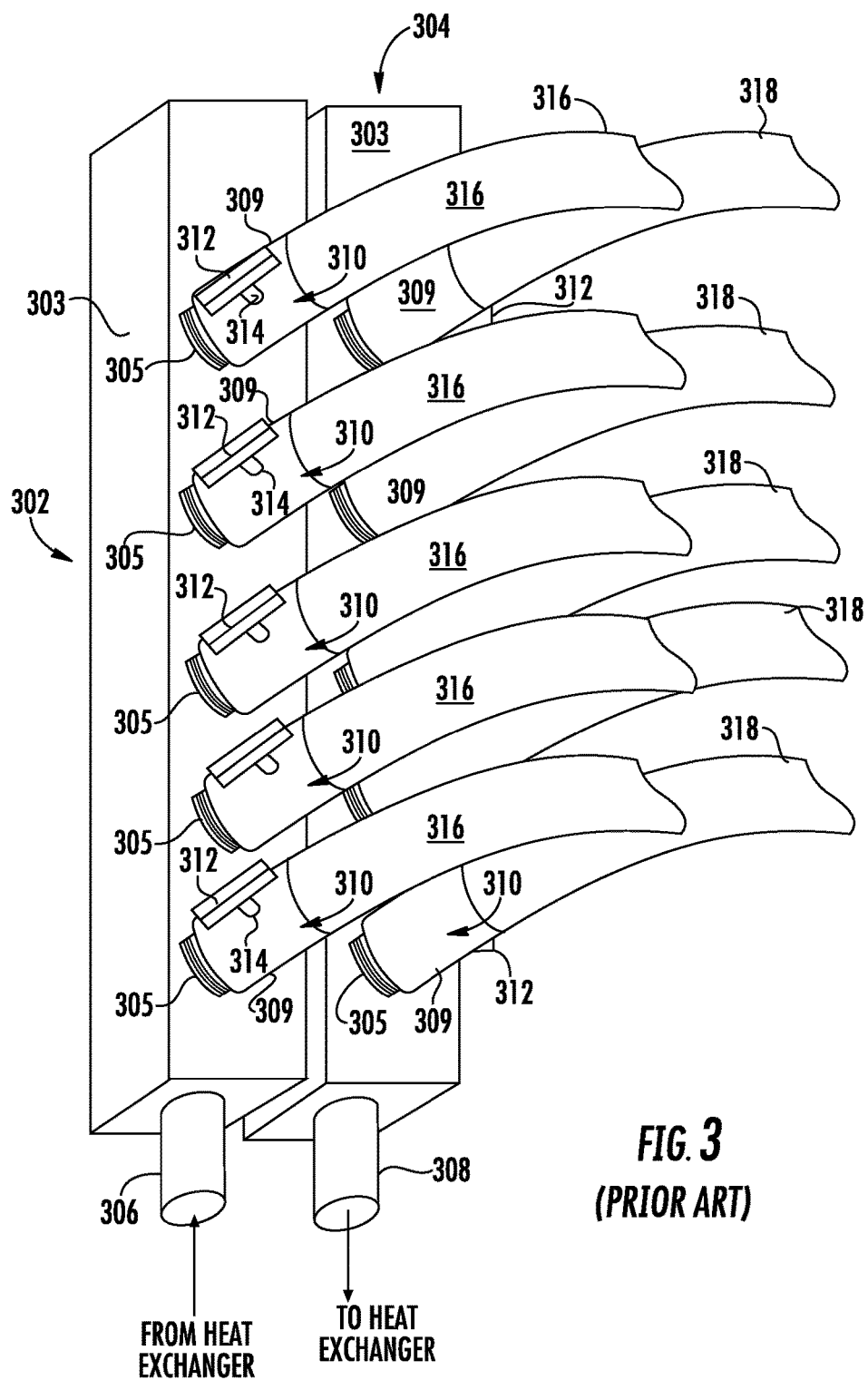
FIG. 3 is drawing which is useful for understanding how a plurality of valves handles can be difficult to access in a conventional manifold system that is used for cooling a mold.

Referring now to FIGS. 1-3 it can be observed that injection molding of plastic parts involves forcing liquefied plastic 105 under pressure into a mold 100 through a sprue 107. The mold is then cooled to solidify the plastic. Cooling is accomplished by circulating a coolant, such as water, around the part through channels 110 that are disposed in in the mold. The coolant continually enters 112 and exits 114 these channels 110 from ports on the outside surface of the mold 100. For example, FIG. 2 show a coolant input port 202 and a coolant exit or return port 204. A coolant input port 202, the corresponding channel(s) 110 through the mold which are supplied coolant by the input port, and the coolant exit or return port 204 are collectively referred to herein as a cooling circuit. A particular mold 100 can include one or more such cooling circuits. Coolant from a heat exchanger (not shown) is supplied to the input port 202 of each circuit through a hose where it travels the channel 110 and cools the part. The coolant becomes heated and exits the circuit into a hose where it returns to a heat exchanger before repeating the cycle.

A mold 100 can have multiple cooling circuits. Accordingly, a supply manifold 302 is used to provide a common point where coolant supply hoses 316 can originate from. The return coolant hoses are then connected to their own return manifold 304 prior so that the coolant can flow to the heat exchanger. The supply manifold 302 has a primary supply port 306 for receiving coolant from the heat exchanger. Likewise, the return manifold 304 has a primary return port 308 to facilitate a return of the coolant to the heat exchanger after such coolant has been heated in the mold. As can be seen in FIG. 3, the supply and return manifolds share a common configuration in which an elongated manifold body 303 facilitates a flow of coolant to a plurality of valve ports 305 disposed along an elongated length thereof.

Since different molds 100 can have a varying number of water circuits, valves 310 are provided at each of the valve ports 305 to allow any unused water circuits to be shut off. In FIG. 3 each manifold is shown to have five (5) valve ports 305. However, it should be appreciated that an actual manifold can have more or fewer of such valve ports. Each valve 310 is comprised of a valve body 309 and generally includes a valve knob or handle 312 mounted which is mounted on a valve stem 314 to facilitate control over the opening and closing of each valve. More particularly, the valve handle 312 can be rotated or turned by an operator to selectively open or close each valve.

The supply and return manifolds 302, 304 are usually located together as shown in FIG. 3 to facilitate a compact manufacturing arrangements in a facility and to provide a common control point for coolant flow operations. But with hoses 316, 318 connected to manifolds 302, 304, the access to some of the valve handles 312 can be obstructed. For example, in FIG. 3, access to the valve control knobs 312 on the return manifold 304 can be difficult because the hoses 316, 318 extend above and over the control handles 312 in a direction toward coolant input and output ports associated with a mold 100. An operator therefore must reach under or through the densely packed hoses 316, 318 to reach the handles 312 on the return manifold 304. If all of the hoses were routed in an opposite direction (to the left in FIG. 3 and across the supply manifold 302) then the valve handles 312 on the return manifold could be easily accessed, but the valve handles on the supply manifold 302 would be obstructed. It will be appreciated that as the number of ports and hoses increase, the greater is the difficulty of accessing the obstructed ones of the valve handles 312.

Figure 4:
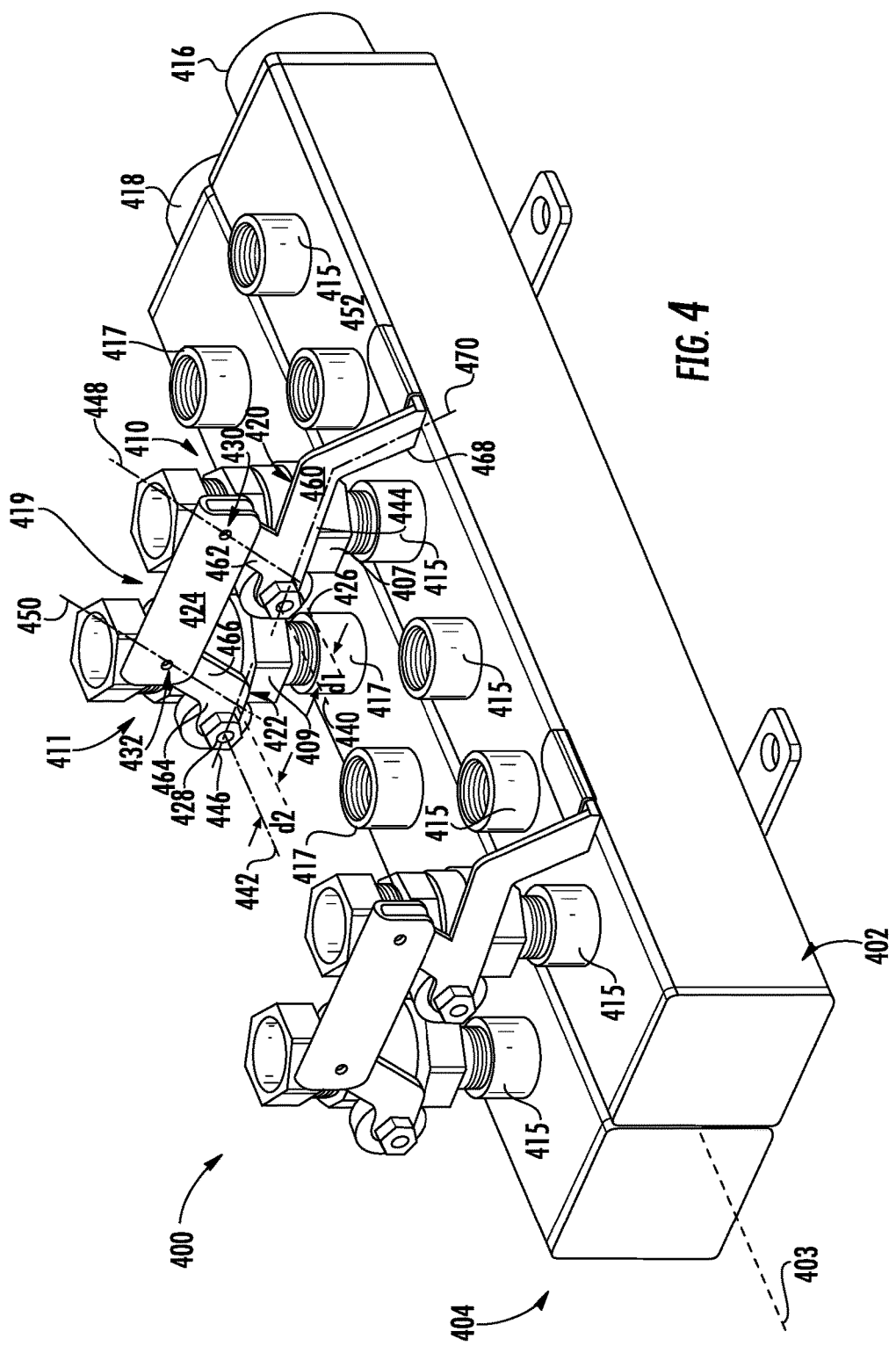
FIG. 4 is a drawing which is useful for understanding a manifold system including a valve linkage system.

Referring now to FIG. 4, an embodiment is shown which includes a supply manifold 402 and a return manifold 404. The supply manifold and the return manifold together define a manifold assembly 400. The supply manifold 402 is disposed adjacent to the return manifold 404 in a manner similar to that shown in FIG. 3. In some embodiments, the supply manifold and the return manifold can be comprised of an integral unit. In other scenarios, they can include interlocking structure or may be held adjacent to each other by means of clamps, brackets or other suitable hardware (not show). In the embodiment shown, each of the supply manifold 402 and the return manifold 404 each respectively has a plurality of valve ports 415, 417 which are respectively aligned along a respective length thereof, parallel to a central axis 403. Of course, manifold assemblies with different arrangements of the valve ports 415, 417 are possible and within the scope of the various embodiments disclosed herein. An internal passage (not shown) defined within the supply manifold 402 provides a fluid path from a primary supply port 416 to the plurality of valve ports 415. Similarly, an internal passage defined within the return manifold 404 provides a fluid path (not shown) from the plurality of valve ports 417 to a primary return port 418.

A plurality of valves are connected externally of the supply manifold 402 and the return manifold 404. More particularly, a first plurality of supply valves 410 are respectively connected to the plurality of valve ports 415 of the supply manifold, and a second plurality of return valves 411 are respectively connected to the plurality of valve ports 417 of the return manifold. In order to avoid obscuring the embodiments disclosed herein, only a single pair of the valves 410, 411 are shown. In practice a plurality of valves can be respectively disposed in the plurality of ports in a manner similar to that shown in FIG. 3. Each valve port 415, 417 can be threaded such that a threaded fitting of each supply valve 410 and return valve 411 can be threaded into the valve ports 415, 417, respectively. Other conduit fitting types can also be used for this purpose without limitation provided that such fitting are capable of forming a water-tight connection.

The supply valves 410 are configured to selectively pass a coolant from the supply manifold and a return valves 411 are configured to selectively pass the coolant to the second manifold after the coolant has respectively traversed one of a plurality of mold cooling circuits. Usually, such a configuration will involve a first hose (e.g., hose 316) to carry coolant from the supply valve 410 to the mold (e.g., mold 100) and a second hose (e.g., hose 318) to carry such coolant from the mold to the return valve 411. In an embodiment disclosed herein, a pair of adjacent valves 410, 411 comprising a valve pair can be associated with a common mold cooling circuit.

In an embodiment shown in FIG. 4, a valve body 407 associated with supply valve 410 can be oriented in the port 415 so that a valve stem 426 extends in a direction aligned with or parallel to the central axis 403. Similarly, a valve body 409 associated with return valve 411 can be oriented in the port 417 so that a valve stem 428. For each adjacent valve pair 410, 411 a mechanical linkage 419 is provided external of the supply manifold 402 and the return manifold 404. The mechanical linkage is configured to facilitate convenient access and concurrent operation of both a supply valve 410 and return valve 411 comprising a valve pair in response to a single operator action. The mechanical linkage provided for each of the adjacent valve pairs is arranged so that a handle grip 452 associated with each such mechanical linkage is on the same side of the central axis 403. As shown in FIG. 5, such an arrangement advantageously ensures that all such handles 452 associated with the plurality of mechanical linkages 419 will remain easily accessible on one side of the manifold system when a plurality of hoses connected to the valves are draped or extended to one side of the manifold assembly. In particular, a plurality of supply hoses 516 and return hoses 518 which are respectively connected to a plurality of supply valves 410 and return valves 411 will all preferably extend away from the manifold system in a direction 512 so that they are draped to only one side of the manifold system opposed from the handle grip portion of the mechanical linkage. The hoses are arranged this way for a plurality of valve pairs disposed along the length of the manifold system so the handle grip of the mechanical linkage provided for each valve pair is easily accessed.

When the operator moves the mechanical linkage to a first position, both the supply valve and the return valve are concurrently opened to allow for the flow of coolant. When the operator moves the mechanical linkage to a second position, both the supply valve and the return valve are concurrently closed to prevent the flow of coolant. Any suitable mechanical linkage can be used for this purposed provided it is compact and does not interfere with the placement of valves in other ports. In the embodiment shown in FIG. 4, a simple arrangement comprising three links is shown. However, the embodiments are not limited in this regard and other arrangements are also possible. For example, in some embodiments the mechanical linkage could comprise a compact arrangement of sector gears which are arranged to facilitate concurrent operation of a valve pair as shown.

The mechanical linkage shown in FIG. 4 includes a first crank arm 420 of the mechanical linkage 419. The first crank arm is fixed to a supply valve control stem 426 associated with the supply valve 410. A second crank arm 422 comprising the mechanical linkage is fixed to the supply valve control stem 428 associated with the return valve 411. The first and second crank arms are secured to the valve control stems 426, 428 so that pivoting of the crank arm in each case about a stem axis 440, 442 will cause a rotation of a corresponding valve control stem 426, 428. For example, each can have a keyed aperture (not shown) comprising a profile that interlocks with a corresponding cross-sectional profile of a valve control stem 426, 428. Each crank arm can be held in place by suitable means such as a threaded nut 504 which is threaded onto the valve control stem to capture the crank arm.

Figure 5A:
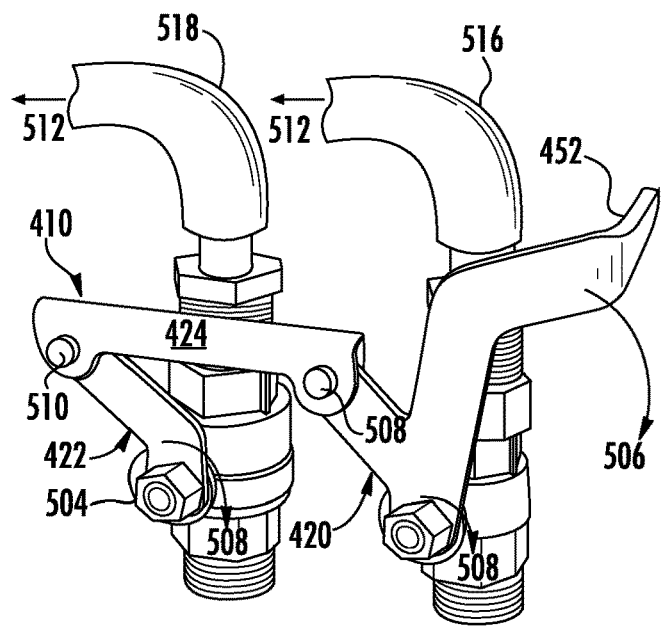
FIGS. 5A and 5B are a series of drawings which are useful for understanding an operation of the valve linkage system in FIG. 4.
Figure 5B:
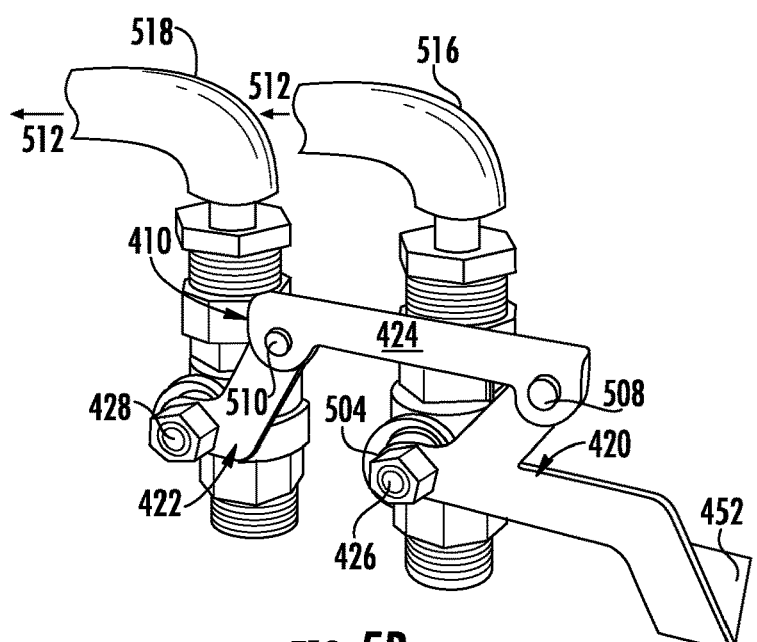

The first crank arm 420 advantageously includes a handle grip portion 452. As shown in FIG. 4, the first crank arm 420 can extend away from the first and second manifolds in a direction transverse to the central axis 403. The extension positions the handle grip 452 so that it is offset from the manifold assembly by a short distance to make the handle grip more accessible to the user. A link member 424 extends from the first crank-arm 420 to the second crank-arm 422. The mechanical linkage 419 is configured so that it facilitates concurrent rotation of the supply valve control stem and the return valve control stem to facilitate concurrent opening and closing of the supply valve and the return valve. This arrangement is illustrated in FIGS. 5A and 5B which respectively show the mechanical linkage in a first and second position. In first position (e.g., the position shown in FIG. 5A) the supply valve and the return valve will both be open. The mechanical linkage is moved to the second position by rotation of the handle in the direction indicated by arrow 506. This operation concurrently rotates both of the valve stems in the directions indicated by arrows 508. In the second position (e.g., the position shown in FIG. 5B), the supply valve and the return valve will both be closed.

It can be observed in FIG. 4 that the first crank-arm 420 includes a first portion 460 which extends along an axis 444 in a direction transverse to a stem axis 426. A second portion 462 of the first crank-arm extends along an axis 448 in a direction which is also transverse to stem axis 426, and intersects the first portion 460 at a location offset a distance d1 from the stem axis 426.

Similarly, the second crank-arm includes a first portion 464 which extends along an axis 446 in a direction transverse to a stem axis 428. In an embodiment, axis 444 and 446 can be parallel as shown. A second portion 466 of the second crank-arm extends along an axis 450 in a direction which is transverse to the stem axis 428, and intersects the first portion at a location offset a distance d2 from the stem axis 428, where d1=d2. In an embodiment, axis 448 and 450 can be parallel as shown.

The link member 424 is pivotally connected to the second portion 462 of the first crank-arm at pivot joint 430, distal from axis 444 of the first crank arm and from the supply valve control stem 426. In some embodiments, the pivot joint 430 can comprise a pin journaled in an aperture which is defined in the link member. The link member 424 is pivotally connected to the second portion 466 of the second crank arm at pivot joint 432, distal from axis 446 of the second crank arm and from the return valve control stem 428. The link member 424 is arranged so that it extends in a direction which is parallel to the axes 444, 446 and perpendicular to both of the stem axes 426, 428.

An end part 468 of first portion 460 which is distal from the stem axis 426 can be arranged to form a handle grip which is easily accessible by a user, regardless of handle operating position. For example, to facilitate the operation of a handle grip 452, the end part 468 can extend along axis 470 which forms an obtuse angle α with axis 444 so that the end part extends downwardly away from the link member 424. Exemplary values for a can range from 100° to 145°. However, the exact angle is not critical and embodiments are not limited in this regard. Stated differently, the first portion 460 of the first crank arm 420 extends along axis 444 in a radial direction with respect to the first stem axis, and deviates from the radial direction along end portion 468 which is distal from the supply valve control stem.

Similarly, the first portion 464 of second crank arm 422 which is proximal to the return valve control stem 428 extends in a radial direction along axis 446, away from the stem axis 442. The second portion 466 then deviates from the radial direction along second portion 466 which is spaced apart or distal from the return valve control stem.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the embodiments have been illustrated and described with respect to one or more implementations, equivalent alterations and modifications will occur to others skilled in the art upon the reading and understanding of this specification and the annexed drawings. In addition, while a particular feature of an embodiment may have been disclosed with respect to only one of several implementations, such feature may be combined with one or more other features of the other implementations as may be desired and advantageous for any given or particular application. Thus, the breadth and scope of the embodiments disclosed herein should not be limited by any of the above described embodiments. Rather, the scope of the invention should be defined in accordance with the following claims and their equivalents.

I claim:

1. A method for improving access to a plurality of coolant valves in an injection molding system, comprising:
providing a first manifold disposed adjacent to a second manifold so that a plurality of ports disposed along a length of the first manifold and a plurality of ports disposed along a length of the second manifold are each aligned along a direction which is parallel to a central axis of a manifold assembly;
connecting external to the first manifold at least one plurality of supply valves which are arranged to selectively pass a coolant from the first manifold respectively to each of a plurality of mold cooling circuits in an injection molding system when one or more of the plurality of supply valves are in an open position;
connecting external to the second manifold a plurality of return valves each of which are arranged to selectively pass the coolant from a respective circuit of the plurality of mold cooling circuits to the second manifold when in an open position; and
for each adjacent valve pair comprising a supply valve and a return valve associated with a common mold cooling circuit, using a mechanical linkage external of the first and second manifold to mechanically couple a supply valve control stem of the supply valve to a return valve control stem of the return valve; and
concurrently transitioning at least one of the adjacent valve pairs between the open position and a closed position, in which coolant cannot pass to the plurality of mold cooling circuits, by using a handle grip portion of the mechanical linkage;
wherein the mechanical linkage extends away from the first and second manifolds in a direction transverse to the central axis of the manifold assembly, and comprises
a first crank-arm fixed to the supply valve control stem for rotation therewith,
a second crank-arm fixed to the return valve control stem for rotation therewith,
a link member which extends from the first crank-arm to the second crank-arm,
the handle grip portion integral with one crank-arm of the first and second crank-arms, and having a graspable portion with an elongate grasping surface that extends parallel to the central axis of the manifold assembly and defines a handle axis, where
the graspable portion is coupled to a first portion of the crank-arm which extends along an extension axis in a direction perpendicular to a stem axis of the supply or return valve control stem,
the handle axis remains parallel to the central axis of the manifold assembly throughout a range of motion defined by a rotation of the first and second crank-arms, and
the handle axis is offset a distance from a plane defined by the extension axis and the stem axis.

2. The method according to claim 1, further comprising arranging the mechanical linkage provided for each of the adjacent valve pairs so that the handle grip portion associated with each said mechanical linkage is on the same side of the central axis.

3. The method according to claim 2, further comprising routing a plurality of supply hoses and return hoses which are respectively connected to the plurality of supply valves and return valves to extend away from the manifold system.

4. The method according to claim 1, wherein the mechanical linkage is configured to concurrently operate the supply valve and return valve of an adjacent valve pair exclusively from a single location disposed on one side of the central axis.

5. The method according to claim 1, further comprising selectively using the mechanical linkage associated with one or more of the adjacent valve pairs to disable at least one of the plurality of cooling circuits that are not in use.

6. A manifold system for an injection molding apparatus having improved access to a plurality of coolant valves, comprising:
a first manifold disposed adjacent to a second manifold, each of the first and second manifolds having a plurality of ports respectively aligned along a length direction which is parallel to a central axis of a manifold assembly;

a plurality of supply valves disposed externally of the first manifold and respectively connected to the plurality of ports, the plurality of supply valves each configured to selectively pass a coolant from the first manifold;

a plurality of return valves disposed externally of the second manifold and respectively connected to the plurality of ports, the plurality of return valves each configured to selectively pass the coolant to the second manifold after said coolant has respectively traversed one of a plurality of mold cooling circuits;

wherein each of a plurality of adjacent valve pairs comprises a supply valve and a return valve associated with a common mold cooling circuit;

wherein a mechanical linkage is provided external of the first and second manifold so as to be operatively connected to a supply valve control stem of the supply valve and to a return valve control stem of the return valve; and wherein the mechanical linkage extends away from the first and second manifolds in a direction transverse to the central axis of the manifold system, and comprises a first crank-arm fixed to the supply valve control stem for rotation therewith, a second crank-arm fixed to the return valve control stem for rotation therewith, a link member which extends from the first crank-arm to the second crank-arm, a handle grip portion configured to facilitate concurrent rotation of the supply valve control stem and the return valve control stem, whereby movement of the handle grip portion by an operator can concurrently transition both the supply valve and the return valve from an open state to a closed state, being integral with one crank-arm of the first and second crank-arms, and having a graspable portion with an elongate grasping surface that extends parallel to the central axis of the manifold assembly and defines a handle axis, where the graspable portion is coupled to a first portion of the crank-arm which extends along an extension axis in a direction perpendicular to a stem axis of the supply or return valve control stem, the handle axis remains parallel to the central axis of the manifold assembly throughout a range of motion defined by a rotation of the first and second crank-arms, and the handle axis is offset a distance from a plane defined by the extension axis and the stem axis.

7. The manifold system according to claim 6, wherein the mechanical linkage provided for each of the adjacent valve pairs is oriented so that the handle grip portion associated with each said mechanical linkage is on a common side of the central axis.

8. The manifold system according to claim 6, wherein a plurality of supply hoses and return hoses which are respectively connected to the plurality of supply valves and return valves extend away from the manifold system.

9. The manifold system according to claim 6, wherein the first crank-arm extends transverse to a first stem axis aligned with the supply valve control stem, and the second crank-arm extends transverse to a second stem axis aligned with the return valve control stem.

10. The manifold system according to claim 6, wherein the link member is pivotally connected to a first end portion of the first crank-arm distal from the supply valve control stem, and pivotally connected to a second end portion of the second crank arm distal from the return valve control stem.

11. The manifold system according to claim 10, wherein the link member extends in a direction which is transverse to both of the first stem axis and the second stem axis.

12. The manifold system according to claim 10, wherein the first crank arm extends in a first radial direction away from the first stem axis along at least a first portion proximal to the supply valve control stem, and deviates from the first radial direction along a second portion distal from the supply valve control stem.

13. The manifold system according to claim 12, wherein the second crank arm extends in the first radial direction away from the second stem axis along a first portion proximal to the return valve control stem, and deviates from the first radial direction along a second portion distal from the return valve control stem.

* * * * *